June 12, 1956

J. J. NICHTA 2,750,025

MACHINE TOOL

Filed Oct. 22, 1953

INVENTOR.
JOHN J. NICHTA
BY Hudson, Boughton,
Williams, David & Hoffmann
ATTORNEYS

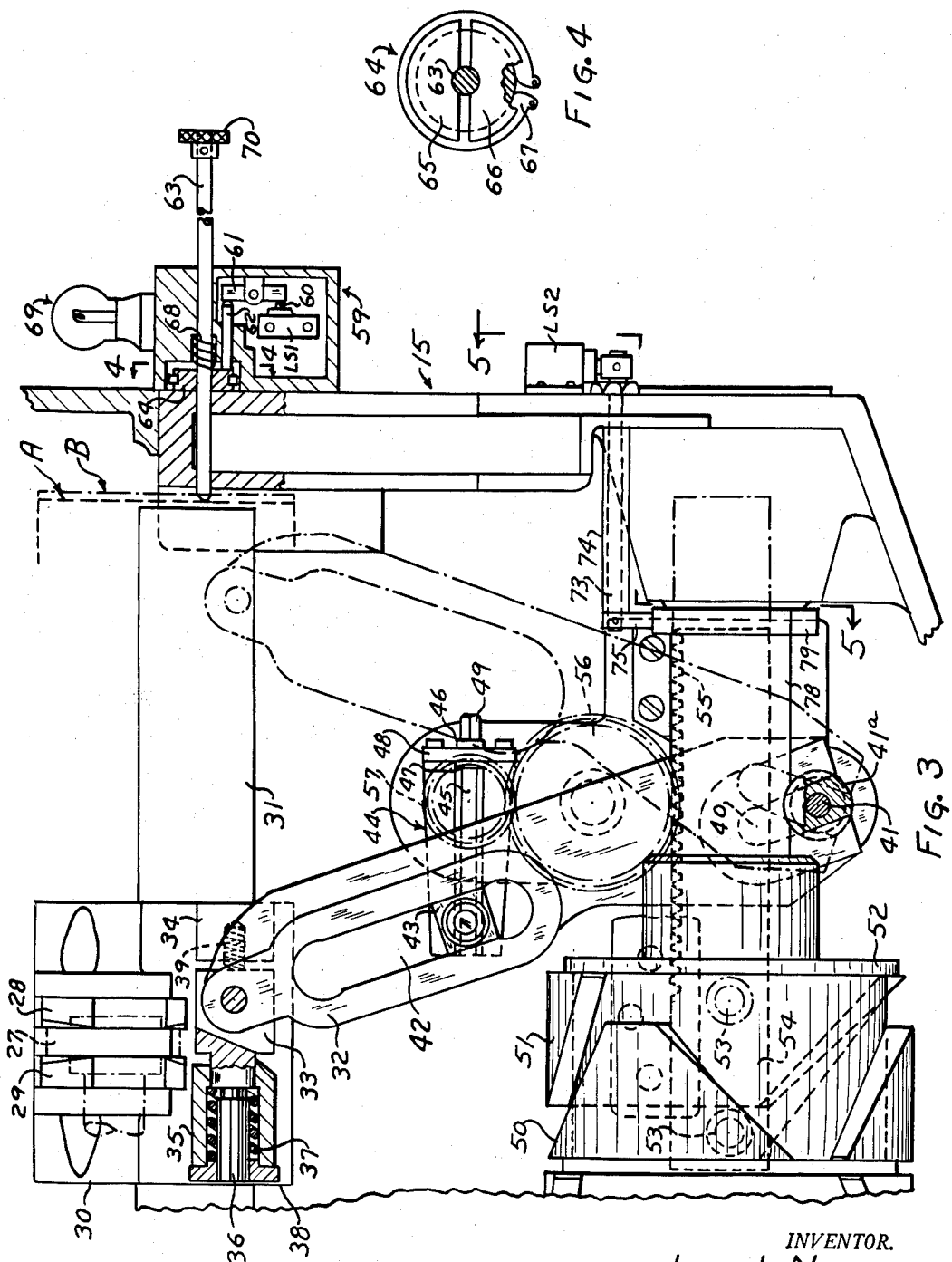

June 12, 1956    J. J. NICHTA    2,750,025
MACHINE TOOL

Filed Oct. 22, 1953    3 Sheets-Sheet 3

INVENTOR.
JOHN J. NICHTA
BY Hudson, Boughton,
Williams, David & Hoffmann
ATTORNEYS 2,750,025
Patented June 12, 1956

2,750,025
MACHINE TOOL

John J. Nichta, Parma, Ohio, assignor to The Warner & Swasey Company, Cleveland, Ohio, a corporation of Ohio Application October 22, 1953, Serial No. 387,563

17 Claims. (Cl. 203—85)

This invention relates to machine tools and, more particularly, to machine tools of the type adapted to operate upon bar stock.

An object of the invention is to provide a means for indicating when a new length of bar stock should be supplied to a machine tool of the type adapted to operate upon material of that nature.

Another object of the invention is to provide an indicating means cooperating with the bar feeding mechanism of a machine tool in a manner such that the operator is informed of the need to supply a new length of bar stock when the bar gripping portions of the feeding mechanism slip off the end of the length of bar stock being fed.

A further object of the invention is to provide an indicating means as defined above which is rendered operative only at a predetermined period of a cycle of stock feeding operations thereby preventing erroneous indications which might result from vibrations or the like.

An additional object of the invention is to provide an indicating means as defined above which is easily and rapidly adjusted without the need of tools or gauges and which may be readily applied as an attachment on existing machine tools.

A more specific object of the invention is to provide a means for moving a portion of a bar stock feeding mechanism of a machine tool to an extreme or abnormal position when the stock engaging portions of the mechanism slip over the end of a length of stock and an indicating means actuated by movement of the stock feeding mechanism to the said extreme position whereby the operator of the machine tool is informed that a new length of bar stock is required.

A more specific object of the invention is to provide a lost motion connection between the stock engaging portions of a bar stock feeding means for a machine tool and the actuating member therefor with a spring means acting therebetween in the direction tending to provide an additional movement of a portion of the feeding mechanism in the non-feeding direction when the stock engaging portions slip over the end of a length of stock, and an indicating means actuated by such additional movement of the stock feeding mechanism to inform the operator that a new length of bar stock is required.

The invention further resides in certain novel features of the construction and arrangement of the parts of the apparatus in which the invention is embodied, and further objects and advantages thereof will be apparent to those skilled in the art from the following description of the presently preferred embodiment of the invention taken in conjunction with the accompanying drawings, forming a part of this application, and in which:

Fig. 3 is a detached fragmentary view, principally in side elevation but with portions broken away and others shown in section, illustrating the manner in which the indicating means is operated by the stock feeding mechanism;

Fig. 4 is a detached transverse sectional view of a portion of the indicator actuating mechanism, the view being taken substantially on the line 4—4 of Fig. 3;

Figure 1:
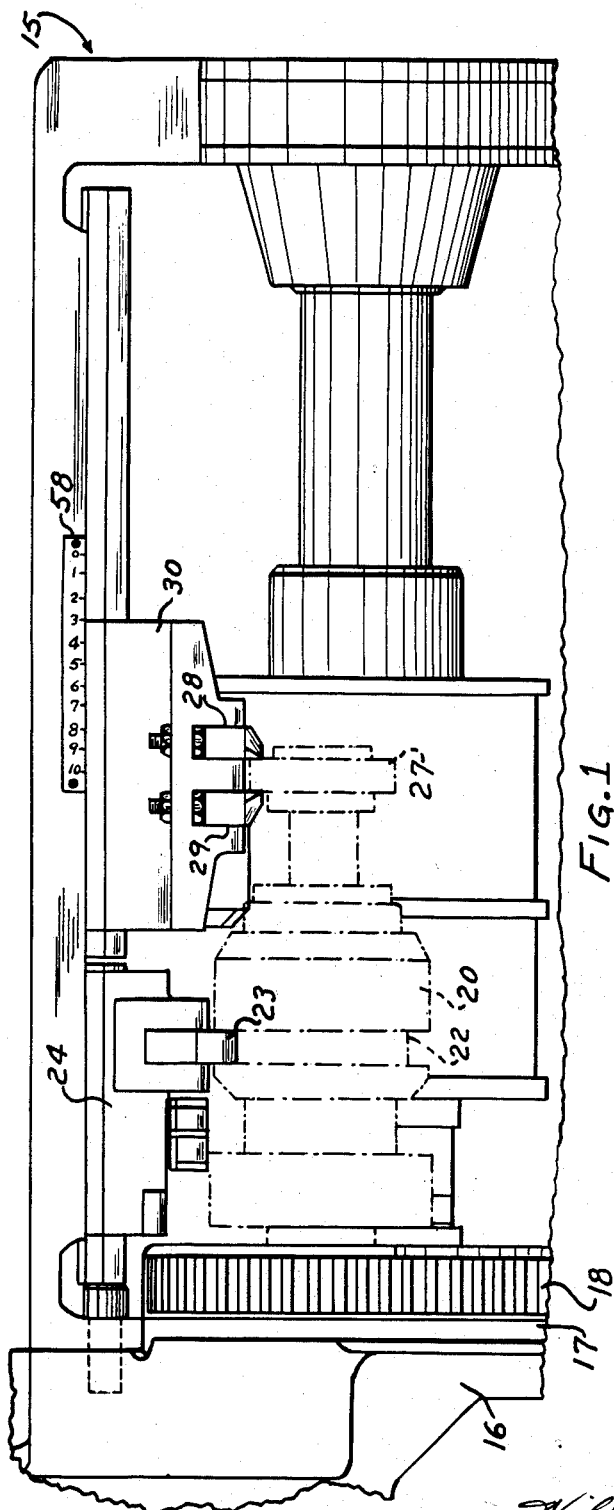
Fig. 1 is a fragmentary plan view of a portion of a multispindle machine tool adapted to operate upon bar stock and showing in dot-dash lines the stock feeding and chuck operating portions of one spindle of the machine when positioned for actuation.

The invention is here illustrated as applied to a multi-spindle machine tool adapted to operate upon bar stock although it will be understood that the invention may also be employed upon single spindle machine tools of this and similar nature. As shown in Fig. 1, the machine tool comprises the usual frame 15, the head stock portion 16 of which is provided with an indexible spindle carrier 17. A portion of the periphery of the spindle carrier is provided with an indexing gear 18 by which the carrier is indexed, through mechanism not shown but which is well understood in the art, to successively position the spindles for cooperation with chuck actuating and bar feeding mechanisms and the customary tool slides and/or turrets. These portions of the mechanism do not per se form a part of this invention and hence are not illustrated nor described in detail.

Figure 2:
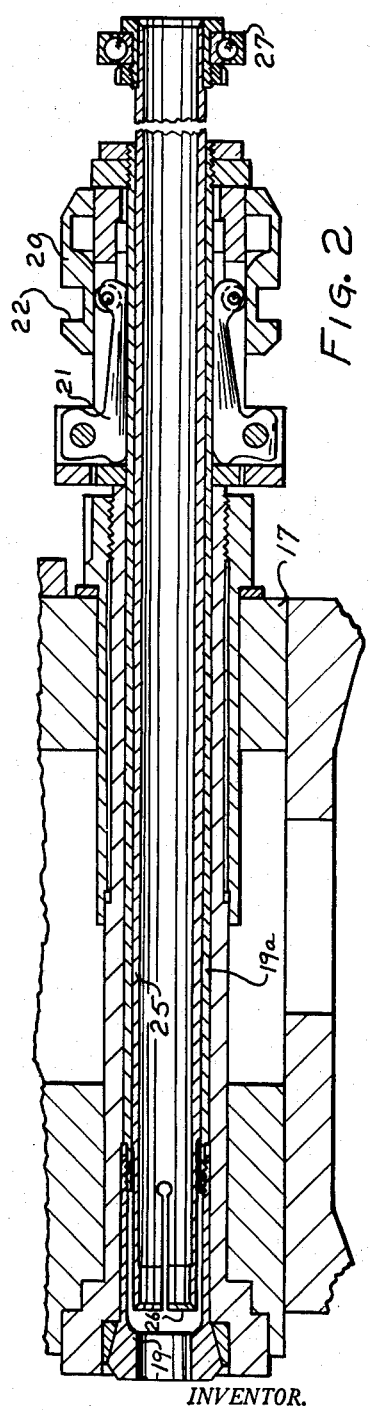
Fig. 2 is a detached longitudinal sectional view through the stock feeding and chuck actuating mechanisms shown in Fig. 1.

The spindles in the spindle carrier are identical and one is illustrated in cross section in Fig. 2 from which it will be apparent that the spindle is provided with a conventional drawback collet chuck 19 and actuating sleeve 19a that is actuated by longitudinal movement of the finger cone or spool 20 which engages and rocks the chuck actuating fingers or levers 21 in a well-known manner. The chuck actuating cone or spool 20 has a peripheral groove 22 which is adapted to engage with a projection 23 on a reciprocable chuck actuating slide 24 when the spindle is indexed to the position indicated in broken lines in Fig. 1, to thereby provide the longitudinal movement of the finger cone or spool 20 which actuates the chuck to and from gripping engagement with bar stock extending therethrough.

Extending within the spindle and through the chuck actuating sleeve 19a is a finger tube 25 of a stock feeding mechanism. This tube is of conventional construction and has the forward portion formed as a plurality of resilient fingers 26 which are adapted to frictionally grip the bar stock and move the latter when the finger tube is reciprocated and the chuck 19 is disengaged. The portions 26 are such, however, that when the chuck 19 engages the stock and the finger tube is moved relative thereto, the resilient fingers can slip or strip along the stock. To effect reciprocation of the finger tube 25 the rear portion thereof is provided with an antifriction bearing 27 which is positionable between spaced projections 28 and 29 on a reciprocating member 30 of the feeding mechanism when the spindle is indexed to the position indicated in Fig. 1.

Figure 6:
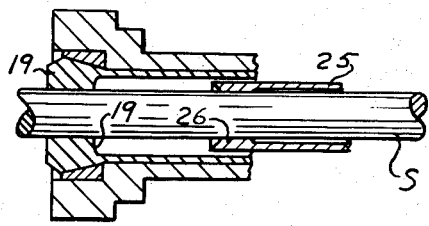
Fig. 6 is a detached fragmentary longitudinal sectional view through the forward portion of the stock feeding mechanism and the work holding chuck showing the position of the parts at the end of a feeding stroke when the remaining stock is of sufficient length for the stock engaging portions of the feeding mechanism to remain thereon.

The construction thus far described is conventional and hence only the following brief review of the operation thereof is deemed essential for an understanding of this invention. When the spindle carrier 17 is indexed to dispose a spindle thereof in position for chuck actuation and stock feeding, the cone or spool 20 will have the groove 22 engaged with the projection 23 of the actuating slide 24 and the bearing 27 on the finger tube 25 will be engaged between the projections 28 and 29 of the feeding mechanism reciprocating member 30. The slide 24 is then moved, by mechanism not shown, in the direction which disengages the collet chuck 19 from the bar stock extending therethrough and, while the chuck is thus disengaged, the slide 30 of the feeding mechanism moves forwardly so that the finger tube 25 feeds the bar stock through the chuck until the forward end of the stock engages a stop, not shown. Thereafter, the slide 24 moves in the opposite direction, thereby clamping the collet chuck 19 upon the bar stock and, when the stock is thus held, the slide 30 moves in the opposite direction to its previous movement, that is rearwardly of the machine, thereby retracting the finger tube 25 which now slips or strips over the bar stock as is indicated in Fig. 6.

In accordance with this invention, the reciprocating member 30, which actuates the stock feeding finger tube 25, is associated with its actuating mechanism through a lost motion connection that is utilized to provide an indication to the operator when a new length of bar stock should be supplied to the machine. Thus, as shown in Fig. 3, the member 30 is slidingly supported upon a guide way 31 and is reciprocated through a lost motion connection with one end of an actuating lever 32. This lost motion connection is effected by having the upper end of the lever 32 pivoted to a block or stud-like member 33 which is movable between, and selectively engageable with, spaced abutments 34 and 35 provided upon the member 30. The abutment 35 is provided with an opening therethrough in which a reduced diameter portion 36 of the block or stud 33 is slidable. This portion of the member 33 has an integral shoulder engaged with one end of a compression spring 37, the other end of the spring being engaged with an annular member 38 secured at the end of the bore through which the portion 36 of the stud 33 reciprocates. The abutment 34 is provided with an opening or bore extending parallel with the reduced diameter portion 36 of the member 33 and within this bore is positioned one end of a compression spring 39 the outer end of which engages the adjacent face of the member 33.

The lower end of the actuating lever 32 is bifurcated thereby providing a longitudinally extending opening or slot 40 in which is received a stud 41 having the usual rockable shoe 41a fitting in the slot and washers to prevent displacement of the lever 32. The stud 41 is fixed to the frame of the machine and hence provides a pivot for the shoe 41a and the lever. Intermediate its ends, the lever 32 has an elongated slot 42 in which is slidably disposed a crosshead or block 43 which is pivoted to an actuating crank or arm 44. Preferably, this connection of the crosshead or block 43 to the arm 44 is adjustable to thereby regulate the extent of movement of the arm or lever 32. This adjustability is effected, in the illustrated embodiment, by having the crosshead or block 43 pivoted to a nut which is threadably engaged with a screw 45 that is rotatably supported upon the arm 44. The screw 45 is held from longitudinal movement by means of collars or the like 46 and 47 engaging upon either side of the stationary flange or bracket 48 on the arm 44 and the outer end of the screw is provided with a polygonal surface 49 by which the screw may be rotated to thereby adjust the position of the crosshead or block 43 longitudinally of the arm 44.

The crank or arm 44 is rocked in timed relationship with the indexing of the spindles and the operation of the chuck by any suitable mechanism, the means here shown comprising cams, such as 50 and 51, provided upon a member 52 which is rotated in timed relationship with the spindle carrier. The cams 50 and 51 cooperate with a cam follower or roller 53 provided upon a bar 54, which is guided for horizontal movement, thereby effecting reciprocation of the bar from the position as shown in dotted lines in Fig. 3 to the position as shown in broken lines in that figure. The bar 54 is provided with rack teeth 55 which mesh with a gear 56 and the latter in turn meshes with a gear 57 that is connected with the arm 44. It will be apparent from the construction just described, that rotation of the member 52 causes the cams 50 and 51 thereof to act through the cam follower 53 and reciprocate the rod or bar 54 which, in turn, rotates the gears 56 and 57 to effect rocking movement of the arm 44. As a result, the crosshead 43 slides in the slot 42 and actuates the lever 32 from the position shown in full lines in Fig. 3 to the position shown in broken lines in that figure and back again thereby reciprocating the member 30 to effect the aforementioned feeding of the bar stock. The length of stroke of the member 30 and hence the length of bar stock fed is readily adjusted by adjusting the screw 45 with the length of stroke being indicated upon a stationary scale 58 which is positioned adjacent the member 30, see Fig. 1.

Figure 7:
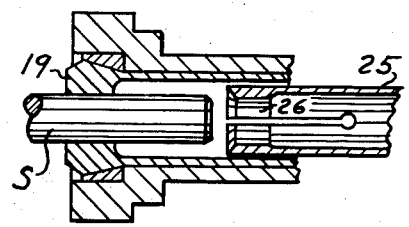
Fig. 7 is a view similar to Fig. 6 but showing the position of the stock feeding mechanism when it has passed over the end of a length of stock and a new length of such stock should be supplied.
Figure 9:
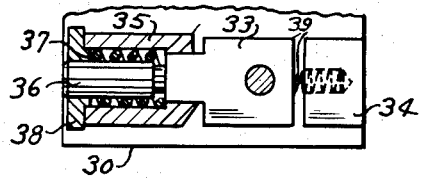
Fig. 9 is a view similar to Fig. 8 but showing the position of the parts of the feeding mechanism for the condition corresponding to that indicated in Fig. 7.
Figure 8:
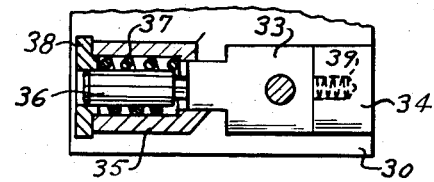
Fig. 8 is a detached fragmentary sectional view through a portion of the stock feeding mechanism showing the positions of the parts thereof during the reverse or non-feeding movement for the condition indicated in Fig. 6.

During the operation of the feeding mechanism just described, the member 33 occupies the position as shown in Fig. 3 when the bar stock has been fed forwardly through the open collet chuck. The free length of spring 37 is as indicated in Fig. 9 and the purpose of this spring is to provide for a slight lost motion or additional movement of the lever 32 after the bar stock has engaged the stationary stop so that the lever retains pressure on the bar stock holding the stock in engagement with the stock stop. During the reverse movement of the member 30 the resilient fingers or portions 26 of the finger tube 25 strip over the bar stock while the latter is held stationary by the collet chuck which is now engaged with the stock. The strength of the spring 39 is such that, when the fingers 26 are thus stripping over the stock, the friction therebetween causes the block or stud 33 to abut and be firmly engaged with the abutment 34 through compression of the spring 39 as is indicated in Fig. 8. Therefore, the rear position of the reciprocating member 30 at the end of its reverse movement will be substantially as indicated in dotted lines indicated at A in Fig. 3 and this is the position which the member 30 will reach at the end of each return stroke after a feeding operation so long as the finger tube remains in engagement with the stock. However, when the length of stock is such that the finger tube strips over the end thereof, as shown in Fig. 7, the frictional resistance between the stock and finger tube is, of course, terminated whereupon the spring 39 expands to space the abutment 34 from the block or stud 33. This provides an additional rearward movement of the member or slide 30 so that the latter will now occupy an extreme or abnormal position at the end of its return stroke as is indicated by the broken line representation of the member 30 designated B in Fig. 3. This additional movement of the reciprocating member 30 is employed to provide an indication that a new length of bar stock is needed.

In accordance with this invention, the frame 15 is provided with a housing 59 being positioned to the rear of the member or slide 30. Within the housing 59 is provided an electrical switch LS1 which is preferably of the type known as a microswitch and which has an operating button or member 60. Also positioned within the housing 59 is a switch operating lever 61 one end of which is engaged with the member or button 60 of the switch while the other end is engaged with a pin 62 supported for reciprocating movement in an opening of the housing 59. Extending through the housing 59 and the adjacent portion of the frame 15 is an elongated rod or member 63. This rod or member 63 is freely slidable through the frame 15 and housing 59 and is provided intermediate its ends with a collar or member, generally designated 64, which engages the pin 62 and is adapted to move the latter.

The collar or member 64 is frictionally supported on the member 63 so that it normally tends to move therewith but may move relative thereto when sufficient force is supplied therebetween. As here shown, the member 64 comprises two generally semicylindrical portions 65 and 66 which each have a central, axially extending groove engaged with the rod or member 63 and a peripheral groove in which is disposed a resilient retaining member or spring 67. The member or collar 64 is disposed between the outer face of the frame 15 and an adjacent face of a recess in the housing 59 which recess is of sufficient dimensions that the collar 64 may move therein longitudinally in an amount sufficient to operate the switch LS1 through the pin 62 and lever 61. Intermediate the housing 59 and the frame 15 is provided a spring 68 which acts upon the collar 64 to normally urge the latter and the rod 63 to the left, as viewed in Fig. 3, and towards the member 30. Positioned upon the housing 59 or at some other convenient location on the machine tool is an indicating means, such as a lamp or the like 69, which is adapted to be energized through operation of the switch LS1 as hereinafter described.

The construction of the indicating mechanism thus far described is such that when the finger tube 25 slips off the end of the bar stock the spring 39 spaces the abutment 34 from the block or stud 33 so that the member 30 has an additional movement in its return stroke causing the member to reach its abnormal position indicated at B in Fig. 3 and strike the end of the rod or member 63 moving the latter against the force of the spring 68. Consequently, the collar 64 moves the pin 62 thereby rocking the lever 61 so that the switch LS1 is actuated.

The rod 63 is initially positioned for operation by disposing the reciprocating member 30 at its normal rearwardmost position for a feeding stroke of predetermined length as for example, as indicated by the dotted lines designated A in Fig. 3, and then moving the rod 63 into engagement with the member 30. This movement is facilitated by the provision of a knob or the like 70 on the end of the member 63 which the operator may grasp in adjusting the position of the rod or member 63. At this time the rod or member 63 will slide through the collar 64 since the latter is positively held against movement by the adjacent face of the frame 15. With the parts thus positioned, the normal reciprocating stroke of the member 30, while the finger tube remains in engagement with the bar stock, cannot move the rod 63 sufficiently to actuate the switch LS1. However, when the bar stock is of such length that the finger tube strips therefrom, as shown in Fig. 7, the additional movement of the slide 30 imparted by the spring 39 is of sufficient magnitude to move the rod 63 and the collar 64 thereon as a unit to actuate the switch LS1. As mentioned heretofore the length of stroke of the feeding mechanism may be adjusted through actuation of the screw or member 45 and when such adjustment is effected, the member 63 must be reset as previously described.

The indicating mechanism including the switch LS1 could be employed without other adjuncts to provide a signal such as illumination of the lamp 69 thereby indicating the need for a new length of bar stock. It has been found, however, that in certain operations, the vibration of the machine tool is such that an erroneous indication might be secured if only the switch LS1 and its associated mechanisms are employed. Consequently, the preferred embodiment of the invention also includes a means by which the indicating mechanism is rendered operative only during a portion of the cycle of stock feeding operation.

Figure 5:
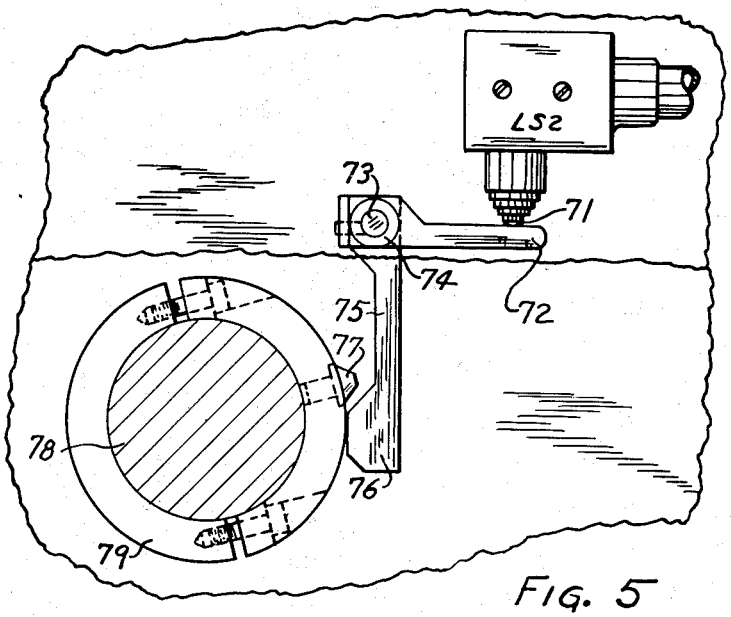
Fig. 5 is a fragmentary detached view taken substantially on the irregular section indicating line 5—5 of Fig. 3 and showing the mechanism for rendering the indicating means operative during a portion only of the cycle of feeding operations.
Figure 10:
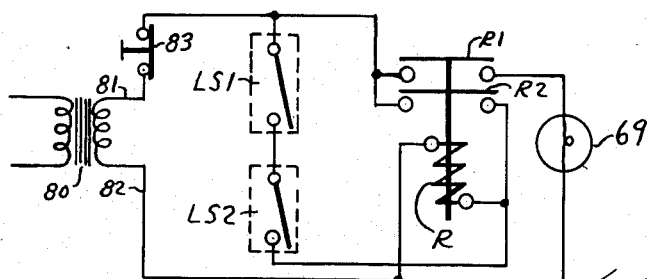
Fig. 10 is a simplified schematic wiring diagram for the electrical circuit of the indicating means.

For this purpose, a second electrical switch LS2 is provided and connected in the energizing circuit for the indicating lamp or other means 69, see Figs. 3, 5 and 10. This switch LS2 has the operating member or button 71 positioned for engagement by an arm 72 which is secured to one end of a shaft 73. This shaft is rockably supported in a hollow tube or housing 74 secured to the frame 15 and extending substantially parallel with the shaft on which the feed actuating cams 50 and 51 are mounted. The inner end of the shaft 73 has a radially extending arm 75 secured thereto the lower end of which has a nose portion 76 which is adapted to be engaged by a cam 77 carried upon, or moved in timed relationship with, the shaft which is provided with the feed actuating cams 50 and 51. As shown in Fig. 5, the projection 77 is adjustably mounted upon such a shaft 78 by having the cam carried by a split ring 79 which is clamped to the shaft thereby permitting circumferential adjustment of the cam 77 relative to the shaft. The shape and position of the cam 77 is such that it engages the nose 76 and rocks the arm 75 approximately 10° of rotation of the shaft 78 before the slide 30 is at its rearwardmost position, and the arm 75 is held thus actuated by the cam 77 for an additional 10° of rotation of the shaft.

The switches LS1, LS2 and the indicating lamp or other means 69 are electrically interconnected as indicated in Fig. 10. As shown therein, the indicator circuit is provided with electrical energy through a transformer 80, the output of which is connected to the main leads or wires 81 and 82 of the circuit for the indicating means. The switches LS1 and LS2 are connected in series between the wire or lead 81 and one terminal of a relay or contactor R, the other terminal of which is connected to the wire 82. The relay or contactor R is provided with two normally open contacts R1 and R2 which are adapted to be moved to circuit closing position when the relay or contactor is energized. The contact R1 is connected between the wire 81 and one terminal of the lamp 69, the other terminal of the lamp being connected with the wire 82. The contact R2 is connected in parallel with the switches LS1, LS2 between the wire 81 and the adjacent terminal of the coil for the relay or contactor. In addition, the circuit is provided with a normally closed reset switch 83 which is inserted in one of the power supply lines such as 81 intermediate the transformer 80 and the connections to the switches and relay.

It will be apparent from an inspection of the circuit shown in Fig. 10, that when both switches LS1 and LS2 are actuated to closed position, the relay or contactor R is energized thereby actuating its contacts R1 and R2 to circuit closing position. As the result a holding circuit for the relay or contactor is established through the contact R2 while the closing of contact R1 energizes the indicating lamp 69 so that the operator is advised of the need for a new length of bar stock. Moreover, the indicating lamp continues to be illuminated even after the cam 77 has passed the arm 75 and the switch LS2 is open since, as noted above, the relay R is kept energized through its holding circuit. However, after the operator has supplied the new length of bar stock, the indicating lamp may be extinguished by momentarily actuating the reset switch 83. It will also be apparent that momentary actuation of the switch LS1, such as might result from vibration or the like, before the slide or member 30 has returned to its extreme rearward position cannot effect actuation of the indicating lamp since the indicating lamp is rendered operative to respond to actuation of the switch LS1 only during that portion of the stock feeding cycle when the slide or member 30 is positioned to actuate the switch LS1.

In operating a machine tool provided with an indicating means of the type described, the indexing of the spindle carrier 17 successively positions each spindle of the machine tool for cooperation with the chuck actuating slide 24 and the stock feeding slide 30. When a spindle is thus positioned, the operation of slide 24 releases the collet chuck 19 of that spindle and then slide 30 is moved to the left as viewed in the drawings thereby feeding the stock through the chuck until the stock abuts against the stock stop. Thereafter, the chuck is engaged with the work and the slide 30 returns the finger tube 25 to its starting position by stripping the fingers 26 of this finger tube over the stock. So long as the length of stock is such that the finger tube 25 remains in engagement with the stock when the slide 30 has reached its normal rearwardmost position, the indicating mechanism is not actuated since the spring 39 is compressed during this rearward movement. However, when the finger tube 25 strips over the end of the stock, the loss of the previous friction therebetween allows the spring 39 to move the slide 30 relative to the block or plug 33 so that the member or slide 30 receives an additional movement and attains an abnormal or excessive position. This moves the rod 63 actuating the switch LS1. During each return movement of the slide 30, the cam 77 will have actuated the switch LS2 for a short interval of time corresponding with the period in which the slide 30 reaches its normal rearwardmost position. Therefore, if a new length of stock is needed, both switches LS1 and LS2 will be closed when the member or slide attains the aforementioned abnormal position thereby energizing the indicating means or lamp 69. The operator may then insert a new length of bar stock through the finger tube 25 and extinguish the lamp by momentary actuation of switch 83.

The operations just described are, of course, the same for each spindle of a multispindle machine tool and occur when the spindle is positioned for stock feeding operation. Consequently, but one indicating means is needed for the several spindles. In the event there is more than one station or position at which stock is fed, then a separate indicating means should be provided for each such station or position. It will also be evident that the mechanism may be employed with a single spindle machine tool as well as with those of multispindle type. It will also be evident that signalling means other than a signal lamp 69 may be employed and that changes may be made in the mechanisms disclosed for operating the stock feed and the indicating means. Therefore, the invention is not to be considered as limited to the specific details of the construction here illustrated and described except as may be required by the spirit and scope of the appended claims.

Having thus described the invention, I claim:

1. In a machine tool adapted to employ bar stock and having a reciprocating stock feeding means provided with stock engaging portions adapted to frictionally grip the stock in feeding the latter in the feeding direction of movement and to slip relative to the stock when the latter is held and the said means is moved in the return or non-feeding direction, the combination comprising a member alternately moved in opposite directions, an operative connection between said member and the stock feeding means to effect reciprocating movement of said means through a predetermined distance while the said stock engaging portions remain in engagement with the stock, means to produce movement of the stock feeding means relative to said member in said return or non-feeding direction when the said stock engaging portions slip off the end of a length of stock so that said feeding means is moved in excess of said predetermined distance in said return or non-feeding direction, an indicating means, and means responsive to said excess movement of said bar feeding means for actuating said indicating means.

2. The combination as defined in claim 1 and further comprising means to adjust the extent of movement of said member to thereby effect feeding of different predetermined lengths of stock, and means to adjust the position of said excess movement responsive means relative to said stock feeding means to compensate for the change in extent of movement thereof resulting from adjustment of movement of said member.

3. The combination as defined in claim 1 and further comprising means operated in timed relationship with said member and operatively associated with said indicating means to prevent actuation of the latter until said stock feeding means is adjacent the end of its movement in said return or non-feeding direction.

4. In a machine tool adapted to employ bar stock and having a reciprocating stock feeding means provided with stock engaging portions adapted to frictionally grip the stock for feeding the latter in the feeding direction of movement and to slip relative to the stock when the latter is held and the said means is moved in the return or non-feeding direction, the combination comprising a member alternately moved in opposite directions, a lost motion connection between said member and the stock feeding means operative to effect reciprocating movement of said means through a predetermined distance while the said stock engaging portions remain in engagement with the stock, means to produce movement of the stock feeding means relative to said member when the said stock engaging portions slip off the end of a length of stock so that said feeding means is moved to an abnormal position at the extreme of its movement in said return or non-feeding direction, an indicating means, and means responsive to movement of said stock feeding means to said abnormal position for actuating said indicating means.

5. In a machine tool adapted to employ bar stock and having a reciprocating stock feeding means provided with stock engaging portions adapted to frictionally grip the stock for feeding the latter in the feeding direction of movement and to slip relative to the stock when the latter is held and the said means is moved in the return or non-feeding direction, the combination comprising a member alternately moved in opposite directions, a lost motion connection between said member and the stock feeding means operative to effect reciprocating movement of said means between two locations spaced apart a predetermined distance while the said stock engaging portions remain in engagement with the stock, one of said locations defining the end of the feeding direction of movement and the other location defining the end of the return or non-feeding direction of movement, spring means cooperating with said lost motion connection to produce movement in the return or non-feeding direction of the stock feeding means relative to said member when the said stock engaging portions slip off the end of a length of stock thereby causing said stock feeding means to move beyond the said other of said locations, an indicating means, and means responsive to said movement of said bar feeding means beyond the said other location for actuating said indicating means.

6. In a machine tool adapted to employ bar stock and having a reciprocating stock feeding means provided with stock engaging portions adapted to frictionally grip the stock in feeding the latter in the feeding direction of movement and to slip relative to the stock when the latter is held and the said means is moved in the return or non-feeding direction, the combination comprising a member alternately moved in opposite directions, a lost motion connection between said member and the stock feeding means operative to effect reciprocating movement of said means through a predetermined distance while the said stock engaging portions remain in engagement with the stock, means to produce an additional movement of the stock feeding means in the return or non-feeding direction when the said stock engaging portions slip off the end of a length of stock, an indicating means, a rod adapted to be longitudinally moved by said member when the stock feeding means is given said additional movement, and a lateral projection on said rod adapted to actuate said indicating means when the rod is moved by said member.

7. The combination as defined in claim 6 wherein said lateral projection is a member separate from said rod and frictionally retained thereon whereby the position of the projection on said rod may be readily adjusted.

8. In a machine tool adapted to employ bar stock and having a reciprocating stock feeding means provided with stock engaging portions adapted to frictionally grip the stock for feeding the latter in the feeding direction of movement and to slip relative to the stock when the latter is held and the said means is moved in the return or non-feeding direction, the combination comprising a member alternately moved in opposite directions, an operative connection between said member and stock feeding means to effect reciprocating movement of said means through a predetermined distance while the said stock engaging portions remain in engagement with the stock, means to produce movement of the stock feeding means relative to said member in said return or non-feeding direction when the said stock engaging portions slip off the end of a length of stock thereby causing said feeding means to move in excess of said predetermined distance in said other direction, electrically operated indicating means, switch means responsive to said excess movement of the stock feeding means in the return or non-feeding direction, and electrical circuit means interconnecting said switch means with said indicating means to effect operation of the latter when said switch means is operated in response to said excess movement of the stock feeding means in the return or non-feeding direction.

9. In a machine tool adapted to employ bar stock and having a reciprocating stock feeding means provided with stock engaging portions adapted to frictionally grip the stock for feeding the latter in the feeding direction of movement and to slip relative to the stock when the latter is held and the said means is moved in the return or non-feeding direction, the combination comprising a member alternately moved in opposite directions, an operative connection between said member and stock feeding means to effect reciprocating movement of said means through a predetermined distance while the said stock engaging portions remain in engagement with the stock, means to produce movement of the stock feeding means relative to said member in said return or non-feeding direction when the said stock engaging portions slip off the end of a length of stock thereby causing said feeding means to move in excess of said predetermined distance in said return or non-feeding direction, electrically operated indicating means, switch means actuated by said excess movement of the stock feeding means, other switch means actuated in timed relationship to movement of the stock feeding means, and electrical circuit means interconnecting said switch means and indicating means in a manner such that the latter is operated only when both of said switch means are actuated.

10. In a machine tool adapted to employ bar stock and having a reciprocating stock feeding means provided with stock engaging portions adapted to frictionally grip the stock for feeding the latter in the feeding direction of movement and to slip relative to the stock when the latter is held and the said means is moved in the return or non-feeding direction, the combination comprising a member alternately moved in opposite directions, a lost motion connection between said member and stock feeding means operative to effect reciprocating movement of said means through a predetermined distance while the said stock engaging portions remain in engagement with the stock, spring means acting between said member and stock feeding means to produce an additional movement of the latter during said return or non-feeding direction of movement when the said stock engaging portions slip off the end of a length of stock, electrically operated indicating means, switch means actuated in response to said additional movement of the stock feeding means, other switch means actuated in timed relationship to movement of said member, and an electrical circuit interconnecting said switch means and indicating means in a manner such that the latter is operated only when both of said switch means are actuated.

11. In a machine tool adapted to employ bar stock and having a reciprocating stock feeding means provided with stock engaging portions adapted to frictionally grip the stock in feeding the latter in the feeding direction of movement and to slip relative to the stock when the latter is held and the said means is moved in the return or non-feeding direction, the combination comprising a first member supported for reciprocation and operatively connected to said stock feeding means to move the latter, a pair of spaced abutments on said first member, a second member including a portion extending between said abutments with a clearance and adapted to move said first member in response to movement of said second member, means to move said second member alternately in opposite directions, spring means cooperating with said members and exerting a force on said first member in a direction tending to move it relative to said second member in the return or non-feeding direction, the strength of said spring being insufficient to overcome the friction between the stock and the said stock engaging portions of the stock feeding means, an indicating means, a member operative to actuate said indicating means, and means supporting the last-mentioned member in position for engagement by said first member when the latter is moved by said spring means relative to said second member as the result of said stock engaging portions of the stock feeding means slipping off the end of a length of stock during the return or non-feeding direction of movement.

12. The combination as defined in claim 11 and further comprising means operated in timed relationship with the means for moving said second member and operatively associated with said indicating means to prevent actuation of the latter until said stock feeding means is adjacent the end of its movement in said other return or non-feeding direction.

13. In a machine tool adapted to employ bar stock and having a reciprocating stock feeding means provided with stock engaging portions adapted to frictionally grip the stock in feeding the latter in the feeding direction of movement and to slip relative to the stock when the latter is held and the said means is moved in the return or non-feeding direction, the combination comprising a first member supported for reciprocation and operatively connected to said stock feeding means to move the latter, a pair of spaced abutments on said first member, a second member including a portion extending between said abutments with a clearance and adapted to move said first member in response to movement of said second member, means to move said second member alternately in opposite directions, spring means cooperating with said members and exerting a force on said first member in a direction tending to move it relative to said second member in the direction return or non-feeding of movement of the stock feeding means, the strength of said spring being insufficient to overcome the friction between the stock and the said stock engaging portions of the stock feeding means, an electrically actuated indicating means, switch means operatively connected to said indicating means for controlling energization of the latter, and switch operating means including a portion positioned for engagement by said first member when the latter is moved by said spring means relative to said second member as the result of said stock engaging portions slipping off the end of a length of stock during the return or non-feeding direction of movement of the stock feeding means.

14. The combination as defined in claim 13 and further comprising means to adjust the extent of movement of said second member to thereby effect feeding of different predetermined lengths of stock, and means to adjust the said switch operating means relative to said first member to compensate for the change in the extent of movement thereof resulting from adjustment of the extent of movement of said second member.

15. In a machine tool adapted to employ bar stock and having a reciprocating stock feeding means provided with stock engaging portions adapted to frictionally grip the stock in feeding the latter in the feeding direction of movement and to slip relative to the stock when the latter is held and the said means is moved in the return or non-feeding direction, the combination comprising a first member supported for reciprocation and operatively connected to said stock feeding means to move the latter, a pair of spaced abutments on said first member, a second member including a portion extending between said abutments with a clearance and adapted to move said first member in response to movement of said second member, means to move said second member alternately in opposite directions, spring means cooperating with said members and exerting a force on said first member in a direction tending to move it relative to said second member in the return or non-feeding direction, the strength of said spring being insufficient to overcome the friction between the stock and the said stock engaging portions of the stock feeding means, an electrically actuated indicating means, a first electrical switch connected with said indicating means, a member operative to actuate said switch, means supporting the last-mentioned member in position for engagement by said first member when the latter is moved by said spring means relative to said second member as the result of said stock engaging portions slipping off the end of a length of stock during the return or non-feeding direction of movement of the stock feeding means, a second electircal switch operatively connected to said indicating means to control the operation thereof, means for actuationg said second switch in timed relationship with the operation of the means to move said second member, and circuit means interconnecting said switches and indicating means in a manner such that the latter is operated only when both of said switches are actuated.

16. The combination as defined in claim 15 wherein the member for actuating the first-mentioned switch is a rod supported for longtiudinal movement and provided with a lateral projection adapted to effect switch operation when the rod is moved by said first member.

17. The combination as defined in claim 16 wherein the said lateral projection is a member separate from said rod and frictionally retained thereon whereby the position of said projection may be readily adjusted longitudinally of said rod.

References Cited in the file of this patent

UNITED STATES PATENTS

| | | |
|---|---|---|
| 622,760 | Davenport | Apr. 11, 1899 |
| 2,669,345 | Brown | Feb. 16, 1954 |